Oct. 11, 1949.  H. H. DE LUCE  2,484,692
EGG SHELLER
Filed March 22, 1946
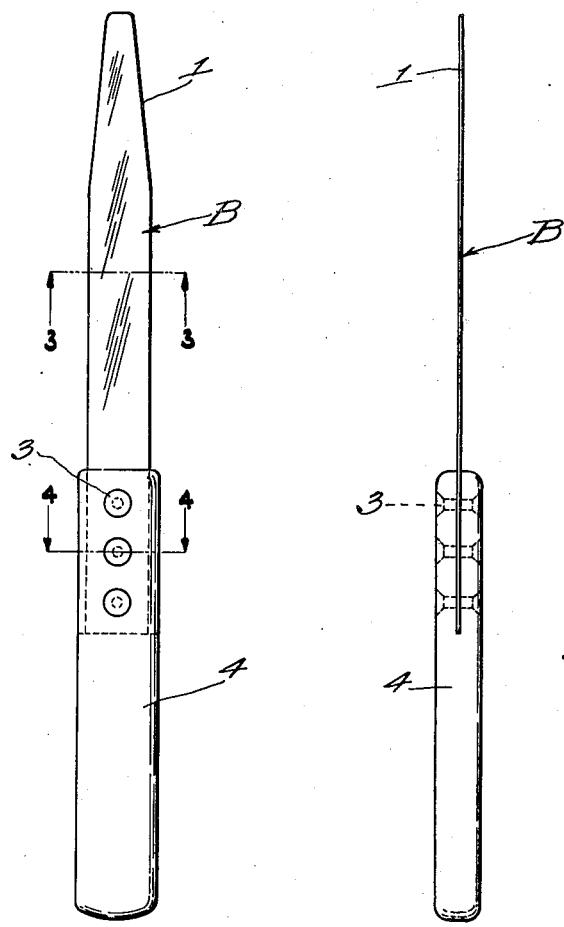
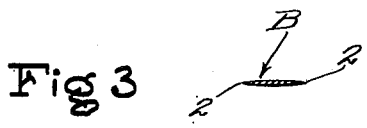
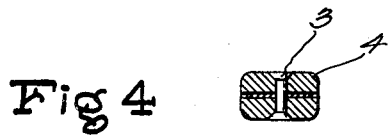
Henry H. De Luce
INVENTOR.
BY
Wilfred E. Lawson Patented Oct. 11, 1949

2,484,692

UNITED STATES PATENT OFFICE 2,484,692

EGG SHELLER

Henry H. De Luce, Minneapolis, Minn.

Application March 22, 1946, Serial No. 656,232

2 Claims. (Cl. 30—346)

This invention relates to an egg sheller and it is primarily an object of the invention to provide an implement of this kind which can be operated to remove egg from its shell with a minimum of waste and with the substantial elimination of the liability of any of the shell sticking to the egg.

It is also an object of the invention to provide an implement of this kind which can be employed with equal advantage in connection with eggs of all sizes and which have been in all degrees of boiling from soft to hard.

The invention consists in the details of construction and in the combination and arrangement of the several parts of my improved egg sheller whereby certain important advantages are attained, as will be hereinafter more fully set forth.

In order that my invention may be the better understood, I will now proceed to describe the same with reference to the accompanying drawing, wherein:

Figure 1 is a view in side elevation of an egg sheller constructed in accordance with an embodiment of the invention;

Figure 2 is an edge elevation of the device as illustrated in Figure 1;

Figure 3 is a sectional view taken substantially on the line 3—3 of Figure 1; and Figure 4 is a sectional view taken substantially on the line 4—4 of Figure 1.

In the present embodiment of the invention the sheller comprises an elongated flat blade B preferably of stainless steel and very thin, of a thickness preferably about .006 inch. The outer portion of the blade B is gradually reduced in thickness from both sides as at 1 with the smaller diameter outermost. This portion serves to facilitate the required application of the implement within the shell of the egg.

The longitudinal marginal portions of the blade B are formed into knife edges, as particularly shown at 2 in Figure 3, while the inner portion of the blade B is suitably secured as at 3 to a handle 4 of desired configuration and design.

In practice, after the egg has been taken from the hot water, the shell is broken at either end and a small portion of the shell at such end is removed. The outer or reduced portion 1 of the blade B is then inserted under the shell pushing the blade B to the opposite end. The thinness of the blade allows the blade to have sufficient flexibility to readily pass between the shell and the egg. Then the egg is turned around the blade resulting in the effective separation of the egg from the shell with the substantial elimination of waste and also with the substantial elimination of any of the shell sticking to the egg.

The utensil can also be employed to advantage to dislodge gelatin, puddings and the like from within dishes.

From the foregoing description it is thought to be obvious that an egg sheller constructed in accordance with my invention is particularly well adapted for use by reason of the convenience and facility with which it may be assembled and operated.

I claim:

1. An implement of the character described comprising a handle, and a relatively long flexible blade secured to the handle at one end and extending longitudinally thereof, said blade comprising a relatively wide thin strip of material having opposite straight parallel longitudinal edges through the major portion of its length from the handle and then tapering in width toward its free end, the tapered edge portions terminating short of intersection one with the other and the free end of the blade having a straight narrow edge perpendicular to the length of the blade.

2. An implement of the character stated in claim 1, wherein said blade has its opposite faces transversely convex, said convex side surfaces merging to form relatively sharp longitudinal edges throughout the length of the blade.

HENRY H. DE LUCE.

REFERENCES CITED

The following references are of record in the file of this patent:

UNITED STATES PATENTS

| Number | Name | Date |
|---|---|---|
| 1,408,368 | Lewis | Feb. 28, 1922 |
| 1,997,953 | Van der Kuy | Apr. 16, 1935 |

FOREIGN PATENTS

| Number | Country | Date |
|---|---|---|
| 752,762 | France | July 24, 1933 |